(12) United States Patent
Bhattacharya et al.

(10) Patent No.: US 11,081,016 B2
(45) Date of Patent: Aug. 3, 2021

(54) PERSONALIZED SYLLABUS GENERATION USING SUB-CONCEPT SEQUENCES

(71) Applicant: International Business Machines Corporation, Armonk, NY (US)

(72) Inventors: Indrajit Bhattacharya, Kolkata (IN); Malolan Chetlur, Bangalore (IN); Sreyash Divakar Kenkre, Bangalore (IN); Vinayaka Pandit, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 508 days.

(21) Appl. No.: 15/901,131

(22) Filed: Feb. 21, 2018

(65) Prior Publication Data
US 2019/0259289 A1    Aug. 22, 2019

(51) Int. Cl.
| | | |
|---|---|---|
| *G09B 7/00* | (2006.01) | |
| *G09B 7/08* | (2006.01) | |
| *G09B 7/04* | (2006.01) | |
| *G09B 19/06* | (2006.01) | |

(52) U.S. Cl.
CPC ............ *G09B 7/00* (2013.01); *G09B 7/04* (2013.01); *G09B 7/08* (2013.01); *G09B 19/06* (2013.01)

(58) Field of Classification Search
CPC ... G09B 7/00; G09B 7/04; G09B 7/08; G09B 19/06; G09B 9/00
See application file for complete search history.

(56) References Cited

U.S. PATENT DOCUMENTS

| | | |
|---|---|---|
| 9,595,205 B2 | 3/2017 | Chong et al. |
| 2004/0076941 A1 | 4/2004 | Cunningham et al. |
| 2004/0197759 A1 | 10/2004 | Olson |

(Continued)

FOREIGN PATENT DOCUMENTS

WO    WO2016093791 A1    6/2016

OTHER PUBLICATIONS

Ahmad A. Kardan et al., "A New Personalized Learning Path Generation Method: ACO-MAP", Indian Journal of Scientific Research (IJSR), 2014, 8 pages, vol. 5, Issue 1, Indian Journal of Scientific Research, India.

(Continued)

*Primary Examiner* — Timothy A Musselman
(74) *Attorney, Agent, or Firm* — Ference & Associates LLC

(57) ABSTRACT

One embodiment provides a method, including: receiving input identifying a goal of a student, wherein the goal indicates (i) a target concept to be learned by the student and (ii) a desired expertise corresponding to the target concept; receiving input indicating constraints comprising (i) a time budget and (ii) an effort budget; and generating a syllabus for the student to reach the goal, wherein the syllabus comprises a sequence of sub-concepts to be learned for reaching the goal, by: producing a plurality of alternative sequences of sub-concepts for reaching the identified goal, each sequence of sub-concepts having both a determined, corresponding (i) effort cost and (ii) time cost, wherein determining the corresponding effort cost and time cost comprises identifying relationships between sub-concepts; and determining, from the plurality of alternative sequences, a particular one of the sequences that reaches the target concept at the desired expertise and fulfills the indicated constraints.

20 Claims, 3 Drawing Sheets

(56) References Cited

U.S. PATENT DOCUMENTS

2011/0065082 A1  3/2011  Gal et al.
2016/0217113 A1  7/2016  Bartle et al.

OTHER PUBLICATIONS

Rakesh Agrawal et al., "Empowering Authors to Diagnose Comprehension Burden in Textbooks", KDD '12, Aug. 12-16, 2012, Beijing, China, 9 pages, ACM Digital Library.

PERSONALIZED SYLLABUS GENERATION USING SUB-CONCEPT SEQUENCES

BACKGROUND

To learn about a topic a person may take a course or access training materials directed at teaching the topic or a related topic that may address the desired topic. For example, if a person wants to learn about algebra, the person may take a college course that is directed towards teaching algebra and topics necessary for learning algebra. As another example, if a person wants to learn how to calculate the volume of a fluid passing through a pipe, the person may take a fluid mechanics course. A person does not necessarily have to take a course through a college or other education environment. Rather, the person may access online sources (e.g., online learning modules, online video tutorials, online resources, etc.), access company resources, buy books discussing the topic, or the like. In other words, a person may learn about the desired topic using different resources or a combination of resources.

BRIEF SUMMARY

In summary, one aspect of the invention provides a method, comprising: receiving input identifying a goal of a student, wherein the goal indicates (i) a target concept to be learned by the student and (ii) a desired expertise corresponding to the target concept; receiving input indicating constraints of the student for reaching the identified goal, wherein the constraints comprise (i) a time budget corresponding to the amount of time the student is willing to expend and (ii) an effort budget corresponding to a level of effort the student is willing to expend; and generating a syllabus for the student to reach the identified goal within the indicated constraints, wherein the syllabus comprises a sequence of sub-concepts to be learned for reaching the identified goal, wherein the syllabus is generated by: producing a plurality of alternative sequences of sub-concepts for reaching the identified goal, each sequence of sub-concepts having both a determined, corresponding (i) effort cost and (ii) time cost, wherein determining the corresponding effort cost and time cost comprises identifying relationships between sub-concepts of one alternative sequence and sub-concepts of another alternative sequence; and determining, from the plurality of alternative sequences of sub-concepts, a particular one of the sequences of sub-concepts that both reaches the target concept at the desired expertise and fulfills the indicated constraints.

Another aspect of the invention provides an apparatus, comprising: at least one processor; and a computer readable storage medium having computer readable program code embodied therewith and executable by the at least one processor, the computer readable program code comprising: computer readable program code configured to receive input identifying a goal of a student, wherein the goal indicates (i) a target concept to be learned by the student and (ii) a desired expertise corresponding to the target concept; computer readable program code configured to receive input indicating constraints of the student for reaching the identified goal, wherein the constraints comprise (i) a time budget corresponding to the amount of time the student is willing to expend and (ii) an effort budget corresponding to a level of effort the student is willing to expend; and computer readable program code configured to generate a syllabus for the student to reach the identified goal within the indicated constraints, wherein the syllabus comprises a sequence of sub-concepts to be learned for reaching the identified goal, wherein the syllabus is generated by: producing a plurality of alternative sequences of sub-concepts for reaching the identified goal, each sequence of sub-concepts having both a determined, corresponding (i) effort cost and (ii) time cost, wherein determining the corresponding effort cost and time cost comprises identifying relationships between sub-concepts of one alternative sequence and sub-concepts of another alternative sequence; and determining, from the plurality of alternative sequences of sub-concepts, a particular one of the sequences of sub-concepts that both reaches the target concept at the desired expertise and fulfills the indicated constraints.

An additional aspect of the invention provides a computer program product, comprising: a computer readable storage medium having computer readable program code embodied therewith, the computer readable program code executable by a processor and comprising: computer readable program code configured to receive input identifying a goal of a student, wherein the goal indicates (i) a target concept to be learned by the student and (ii) a desired expertise corresponding to the target concept; computer readable program code configured to receive input indicating constraints of the student for reaching the identified goal, wherein the constraints comprise (i) a time budget corresponding to the amount of time the student is willing to expend and (ii) an effort budget corresponding to a level of effort the student is willing to expend; and computer readable program code configured to generate a syllabus for the student to reach the identified goal within the indicated constraints, wherein the syllabus comprises a sequence of sub-concepts to be learned for reaching the identified goal, wherein the syllabus is generated by: producing a plurality of alternative sequences of sub-concepts for reaching the identified goal, each sequence of sub-concepts having both a determined, corresponding (i) effort cost and (ii) time cost, wherein determining the corresponding effort cost and time cost comprises identifying relationships between sub-concepts of one alternative sequence and sub-concepts of another alternative sequence; and determining, from the plurality of alternative sequences of sub-concepts, a particular one of the sequences of sub-concepts that both reaches the target concept at the desired expertise and fulfills the indicated constraints.

A further aspect of the invention provides a method, comprising: identifying a target topic to be learned; identifying alternative sequences of sub-topics within the target topic, wherein each alternative sequence comprises a plurality of sub-topics that can be learned to learn the target topic and wherein each alternative sequence comprises at least one sub-topic different from at least one another alternative sequence; learning relationships between sub-topics of one alternative sequence and sub-topics of another alternative sequence, wherein the learned relationships indicate an effort difference between one sub-topic of one alternative sequence and a sub-topic of another alternative sequence; and generating, based upon the learned relationships, a recommended course sequence that is within a predetermined effort level, wherein the recommended course sequence comprises (i) one of the alternative sequences of sub-topics and (ii) a learning source for learning each of the sub-topics.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
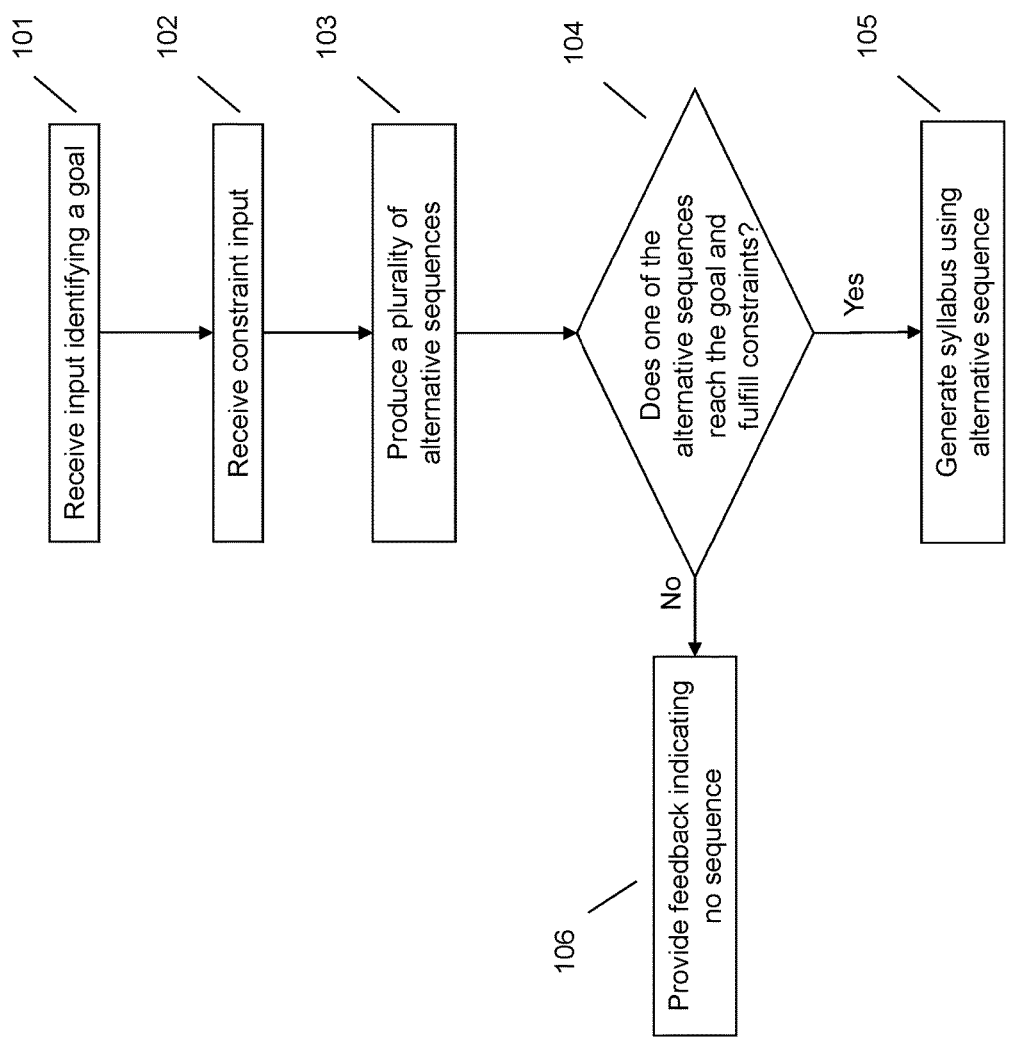
FIG. 1 illustrates a method of generating a syllabus for a student to learn a target concept.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Current learning techniques generally include a curriculum that is a linear list of topics and sub-topics. Thus, teaching the topic or learning about the topic is generally linear, following the curriculum. For example, a teacher may include a syllabus that identifies the order of how the topics will be taught during a class. Accordingly, when a person uses resources to learn about a topic, it may be difficult to identify which sub-topics actually need to be learned in order to learn the desired topic. For example, if a person is attempting to learn only a sub-concept within a book, it may be difficult for the person to identify which sections of the book, or sub-topics, need to be learned to learn only the desired sub-concept.

Additionally, many topics have many different techniques for acquiring the desired knowledge. For example, the order in which different sub-topics are learned for a target concept may be changed or modified depending on the instructor, author, student type, or the like. The order may make learning the desired topic harder or easier depending on the base knowledge of the person learning the topic. For example, if a person having a low base knowledge is attempting to learn a topic from a book that was written for a person having a higher base knowledge, the person may have a very difficult time learning the concept. As another example, one author may explain a topic in a manner which is easier to understand for one person and harder to understand for another person.

Additionally, many people learn at different levels and speeds. For example, one person may learn topics very quickly or may only require high-level explanations of sub-concepts within the topic. On the other hand, another person may learn very slowly or require in-depth explanations of sub-concepts within the topic. Additionally, a person does not learn all topics at the same level. For example, a person may need only high-levels explanations of math topics, but may require in-depth explanations of science topics. Additionally, if a person only wants to learn about a particular sub-topic, the person may have to take an entire course that only briefly mentions that desired sub-topic.

Thus, one problem with the traditional linear learning techniques is that they may be very inefficient or inadequate for a group of people. The linear learning technique is generally directed toward an average person who desires to learn the topic. However, if a person only wants to learn a sub-concept included within a particular topic, it may be very difficult for the person to identify which sub-concepts need to be learned and in which order to learn the desired sub-concept. Additionally, if the person does not learn at the same level as the average person, the person may have difficulty learning the topic.

Another problem with the traditional linear learning technique is that it may be difficult for a person to identify which technique for learning a topic will be most beneficial for that person. In other words, because many topics have different techniques for learning the topic, one technique may be better suited for one learner while a different technique is better suited for a different learner. For example, if one learner has a higher base knowledge, learns at a faster pace, and/or prefers to be challenged when learning topics, the learner may desire a learning technique that reflects these attributes. If, on the other hand, the learner has a lower base knowledge, learns at a slower pace, and/or prefers to have an easier learning experience, the learner may desire a learning technique that reflects these attributes. However, using current linear techniques it may be difficult for the person to identify which learning technique is reflected by the course and/or course materials.

One solution relies on the teacher or author recognizing these problems and providing relief to the student or reader. For example, the teacher or author may provide a form of a dependency graph or chart that identifies the relationship between one sub-concept and another sub-concept when learning a target concept. However, these dependency graphs merely identify pre-requisites between one sub-concept and another sub-concept. The dependency graph does not identify a relationship between learning techniques, for example, if one learning technique is easier or harder than another learning technique, if one learning technique has a faster pace than another learning technique, and the like. Additionally, even with the dependency graph, it may be difficult for a person to identify which sub-concept would be necessary to learn in order to learn a different sub-concept, rather than the entire target concept. Additionally, this technique does not provide a method for identifying relationships between sub-concepts as sub-concepts are added. For example, if a teacher includes a syllabus having sub-concept dependency identifications, and, while teaching the class, has to add a sub-concept, the relationship of this sub-concept to the remaining sub-concepts is not identified.

Accordingly, the techniques and systems as described herein provide a system and method for generating a syllabus for a student that is unique to the student and provides a learning sequence, including an identification of learning modules, for learning a target concept. The system may receive input identifying a goal of a student. The goal may indicate not only a target or desired concept or topic, but may also identify a desired expertise corresponding to the target concept. In other words, the student may identify how proficient at, or knowledgeable about, the topic the student wants to be after engaging in the learning. The student may also identify particular constraints, for example, an amount of time that the student can spend, an amount of effort that the student wants to expend, an amount of money the student is willing to spend, and the like.

The system may then generate a syllabus for the student. The syllabus may identify a sequence of learning modules for the student to access in order to learn the desired topic while meeting the constraints of the student. To identify this sequence, the system identifies relationships between not only sub-concepts of the target concept, but also between alternative sequences of sub-topics. For example, each target concept may include different sources and/or sub-topic sequences for learning the target concept. The system identifies the relationships between these sequences, for example, if one sub-concept source or order is harder or easier than another, if one requires a higher base knowledge than another, and the like. Based upon the relationships between alternative sequences or series, the system can identify which sequence will allow the student to learn the target concept at the desired expertise while still fulfilling the constraints of the student.

Such a system provides a technical improvement over current techniques for topic learning. The system provides a technique for identifying relationships between alternative sequences of sub-topics and/or learning modules in order to identify a learning level for the sequence. Therefore, the system provides a technique for generating a syllabus that is unique to a particular student or learner based upon these identified relationships. The student can identify a target concept, including target concepts that are sub-concepts of a larger target concept that may be the topic of one class. The syllabus is generated based upon the target concept and any additional information the student may provide, for example, how much time the student wants to spend learning the topic, the desired expertise, and the like. Based upon identified relationships between different learning techniques, the system identifies learning modules, which may include a combination of learning sources, to be accessed by the student and the order of access, thereby providing a learning series to the student that is unique to the student and the known attributes of the student.

Additionally, using the same techniques, a syllabus can be generated for an entire classroom that identifies not only pre-requisites between sub-concepts but also an identification of the relationships between different learning techniques, thereby allowing a student to identify the learning method of the course and how difficult learning the topic will be for the student. Thus, the systems and methods as described herein provide a technique for allowing identification of not only relationships between sub-concepts of a target concept, but also identification of relationships between learning techniques for learning the target concept. Accordingly, the system provides a technique allowing for a more efficient and effective learning experience by a student.

FIG. 1 illustrates a method for generating a syllabus for a student that is unique to the student and that provides a learning sequence, including identification of learning modules, thereby allowing the student to learn the target concept based upon attributes of the student. For ease of readability, the term student will be used throughout. However, it should be understood that the term student refers to any person that has identified a target concept for learning. In other words, the term student does not limit the person to only a person who is enrolled in a classroom program. Additionally, the term student may refer to a group of students, for example, the syllabus may be generated for or by a teacher for a group learning session or class.

At 101 the system may receive input identifying a goal of the student. The goal identifies the target concept to be learned by the student. The input to identify the target concept may be received using a variety of methods. For example, the student may select the target concept from a listing of target concepts. As another example, the student may type the name of the target concept, provide a link to an identified target concept, provide voice input, or the like. Additionally, the system may identify that the student appears to be searching for information regarding a particular topic and may use this information to identify a target concept. In other words, in this example, the system may use information not directly provided to the system and may provide recommendations for a target concept and a syllabus for learning the recommended target concept.

The goal may additionally identify a desired expertise corresponding to the target concept. The desired expertise may be how proficient the student wants to be in the target concept after completing the learning sequence or syllabus.

The desired expertise may be in different formats. For example, the student may provide an expertise indication of "proficient", "expert", or the like. As another example, the student may provide an expertise indication related to a particular grade or score for the concept, for example, "A-", "C", or the like. Even if the student is not actually graded in the learning series, the system may determine what sub-topics would need to be known in order to receive such a grade if the learning series was graded.

At 102 the system may receive input indicating constraints of the student for reaching the identified goal. The constraints may identify how much time the student is willing to expend in learning the concept, also referred to as a time budget. The time budget may identify how long the student has to learn the target concept or is willing to spend to learn the target concept. For example, the student may identify a time budget of four weeks. This indicates that the student is willing to spend four weeks before reaching the identified goal. The constraints may also identify the level of effort the student is willing to expend to learn the topic, also referred to as an effort budget. The effort budget may identify how many hours the student is willing to expend in learning the topic. Using the example above, the student may identify that the effort budget is ten hours over the identified time budget of four weeks. The effort budget may also be provided in smaller time increments, for example, the student may identify the effort budget is two hours a day. In other words, the student is willing to dedicate two hours a day to learning the target concept over the four week time budget. The effort budget may also identify particular days that the student is willing to use for learning, for example, the student may be able to dedicate time on Mondays, Wednesdays, and Fridays to learning the target concept.

The student may also identify other constraints that may be used by the system. Another constraint may include a cost budget, for example, how much money the student is willing to expend to learn the target concept. Another constraint may include a travel budget, for example, if the student is willing to travel and how much. Another constraint may include a location, for example, if the student is only willing to access a particular location for learning the target concept. Another constraint may include a source constraint, for example, the student may only be willing to access online sources, classroom sources, company sources, or the like, to learn the target concept. In other words, the constraints may identify what the student is willing to expend for learning the target concept and how the student desires to learn the target concept.

The system may additionally identify a base knowledge of the student. This base knowledge may be identified with respect to the target concept. For example, if the target concept is "Spanish", the system may identify the base knowledge of the student with respect to Spanish. The base knowledge may be categorized into different base knowledge categories. Using the example of Spanish, the system may categorize the base knowledge of the student into reading Spanish, speaking Spanish, and hearing Spanish. Thus, the student may have different base knowledges for each of the categories. These different categories may also be aggregated to determine an overall base knowledge of the student. Identification of the base knowledge may be completed using a variety of techniques. For example, the student may identify a base knowledge. As another example, the system may access sources that identify a base knowledge, for example, a transcript, grading report, or the like. As another example, the system may provide a question/answer session that asks the student questions related to the base knowledge. As an example, the question/answer session may include questions asking the student how comfortable he/she feels with respect to a particular topic or sub-topic.

The system may then generate a syllabus for the student to reach the identified goal while fulfilling the indicated constraints. The syllabus may include a sequence of sub-concepts to be learned for reaching the identified goal. The syllabus may also identify a source for learning each sub-concept included in the syllabus. In other words, for each sub-concept the syllabus may identify the lecture module that is recommended for learning that sub-concept or a group of sub-concepts. A lecture module may include the specific source that is recommended for learning the sub-concept. The source may include any source that can be accessed by the student, for example, an Internet source, book chapter, book, class, company resource, or the like. The lecture module may also have an associated degree of hardness which identifies the level of effort that will be required to achieve the identified expertise. In other words, the degree of hardness identifies what the level of expertise will be after taking the lecture module and how much effort is required for achieving that level of expertise.

To generate the syllabus the system may produce a plurality of alternative sequences of sub-concepts at 103. The alternative sequences may include different sub-concepts for learning a topic. For example, if a topic can be learned by learning alternate sub-topics a sequence or learning series may be generated for each alternate sub-topic grouping. The alternative sequences or series may include sub-topics in a different order. For example, if a target concept can be learned by learning the same sub-concepts in a different order, the system may generate a sequence or series for each of these alternative orders. The alternative sequences may also include different lecture modules for learning a sub-topic. For example, if a sub-concept can be learned using different sources, the system may generate a sequence or series for each of these alternative sources. The alternative sequences each include a corresponding effort cost and a corresponding time cost. Each alternative sequence may also identify other attributes associated with the sequence or sub-concepts within the sequence, for example, a cost, location, source, and the like.

To produce the alternative sequences the system may first determine the concept units or sub-concepts that are included in learning the target concept. The system may also determine the relationship between the concept units. As an example, if the concepts are the Moon and Earth, the relationship between these concepts units is that the Moon revolves around the Earth. In other words, every topic consists of multiple sub-topics with each sub-topic discussing one thing that the student can understand to learn the topic. As stated before, learning a target concept may be accomplished using alternative sub-concepts. Therefore, some concept units may be included in one alternative sequence and not included in another alternative sequence. Once the concept units are determined the system may generate a knowledge graph corresponding to the target concept and including the concept units. Each concept unit would be represented as a node in the knowledge graph and the relationship between the concept units would be represented as an edge connecting two nodes. Once the knowledge graph is created for a target concept, the system may determine a sequence or series that can be used to learn the target concept. In other words, from the knowledge graph the system can identify one or more alternative sequences.

Once the alternative sequences have been identified, the system attempts to determine which one or more alternative sequence will fulfill the goal of the student, while staying within the identified constraints. To make this determination, the system identifies relationships between sub-concepts of one alternative sequence and another alternative sequence. These relationships identify a "difficulty" difference of the sub-concept of one sequence with respect to a sub-concept of another sequence. Some example relationships include "easier than", "base knowledge requirements", "faster pace", and the like. In other words, the relationship identifies a comparison of one or a group of sub-concepts to one or a group of sub-concepts of another sequence or series. To identify these relationships, the system may use a machine learning approach that initially trains the system using a training set of information that allows the system to make predictions about new sets of information that are not specifically programmed into the system.

To identify the relationships the system may take, as input, historical information from a set of current or previous students who are learning or have learned the target concept or sub-concepts of the target concept. The historical information may include student activity information related to the interaction of the student with the topic or sub-topic. For example, the system may identify the sequence that one or more students used to learn the target concept. The system may then identify what grade each student received in the class directed to teaching the target concept. An overall higher average grade by one group of students may indicate that the sequence used by that group is an easier sequence than the sequence used by the group having the lower average grade. The system may also identify a base knowledge of the students when learning the sequence. For example, the system may determine that overall the group had a higher mathematical base knowledge than another group.

The system may also access various other sources to identify other information that may assist in determining the relationships. For example, the system may access a forum or other online location that can be used by students. Using this information the system can determine what questions were asked by the students, which may assist in identifying whether the student had difficulty with a particular sequence. The system may also determine if the student provided feedback regarding a course or sequence of sub-concepts. This feedback may provide information related to how difficult the student found the course, whether the course moved too quickly, or the like.

The system can then build a classifier or ranking mechanism to discriminate one relationship from another relationship. However, individually learning the relationships independently (i.e., comparing a single sub-concept to another single sub-concept) may result in noisy and incorrect relationship labels. Specifically, it should be understood that a relationship between one sub-concept and another may be dependent on a different relationship between two other sub-concepts. Therefore, the system may use a joint learning of the relationships using a joint distribution of edges between nodes. This joint distribution is based upon generation of a directed acyclic graph (DAG) for the alternative sequences.

To generate the DAG, the system first identifies attributes of the nodes that allow grouping of the edges conditionally independently from other groups. For example, one attribute may be the source for the nodes. As an example, if the nodes include sources Book A, Book B, Book C, and Book D, the system may group Book A and Book B in one group and Book C and Book D in another group. Therefore, the edges between Books A and B are independent from the edges between Books C and D. The system then computes each group of edges separately from other groups of edges. Once the edges are grouped, the system identifies prerequisites between sub-concepts within the grouping. In other words, the system identifies which sub-concepts have to be learned before another sub-concept can be learned. The prerequisites may span across the grouping. Using the Book attribute example, a prerequisite for a sub-concept from Book B may be a sub-concept from Book A. The prerequisites may be identified based upon an order of occurrence from the source of the sub-concept, for example, a chapter listing in a book, a syllabus of a class, or other identification of dependency between one sub-concept and another. The prerequisites then induce or create a DAG that includes sub-concepts represented as nodes and relationships between the sub-concepts represented as edges.

Once the DAG is generated, the system may topologically sort the set of possible relationship edges. In other words, the system may sort the DAG topologically. The system may then identify and learn a form for the conditional distribution of the edge conditioned on the parents of the edge. The system may then factorize the joint probability of the edges using the topological order of the edges and the conditional probability distribution, for example, using Bayes' theorem, also referred to as a Bayesian framework, to learn each of the relationships edges. In other words, the system may use a logistic classifier to optimize the likelihood of each relationship (e.g., the probability of the direction of each edge, etc.) and then choose the direction for the edge based on the probability. The direction may be chosen based upon being the direction having the highest probability of occurrence. For example, if the system is trying to determine which sub-concept is easier between two sub-concepts, that relationship may be dependent on a relationship between a previous set of sub-concepts, for example, if one of the previous set of sub-concepts required a higher base knowledge. The system can learn the joint distribution of these edges to determine the relationship both of these edges.

Figure 2:
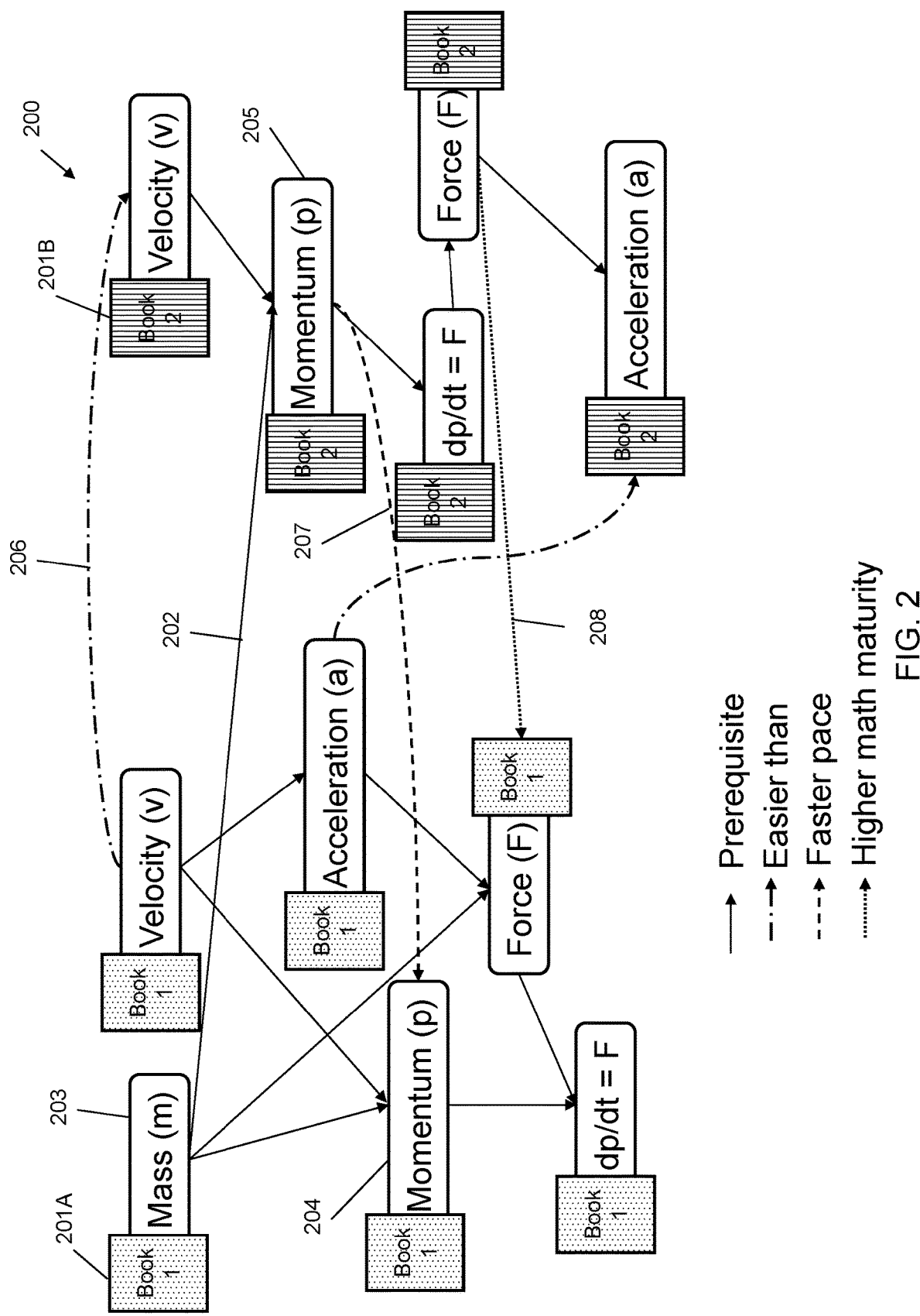
FIG. 2 illustrates an example identification of relationships between sub-topics in alternative sequences.

As an example, FIG. 2 illustrates an example DAG having identified relationships between nodes 200. The system has grouped the sub-concepts by source type, Book 1 201A and Book 2 201B. Thus, the system is attempting to identify relationships between the nodes of Book 1 201A and the nodes of Book 2 201B. The system first identifies prerequisite relationships 202, indicated by solid black lines, between the nodes. As can be seen, the prerequisite relationships can cross between the sub-groups, for example, Mass 203 from Book 1 201A is identified as a prerequisite for both Momentum 204 from Book 1 201A and Momentum 205 from Book 2 201B. The system then identifies the relationships between other sub-concepts within the grouping to identify whether one sub-concept is "easier than" 206 another sub-concept, is a "faster pace" 207 than another sub-concept, or requires a "higher math maturity" 208 than another sub-concept.

The system then determines if one of the alternative sequences fulfills the desired goal (e.g., reaches the target concept at the desired expertise) and fulfills the indicated constraints at 104. If the system determines that no alternative sequence reaches the goal and fulfills the constraints, the system may provide feedback to the user indicating that no sequence fulfilled the requirements at 106. The system may also provide feedback of a sequence and indicate which requirement was not met within that sequence. If, however, the system determines that one or more of the sequences fulfills the requirement, the system may generate a syllabus based upon the sequence(s) that is identified as meeting the requirements at 105. Thus, the system produces a syllabus that is unique to a student and is based upon the student's needs, requirements, and goals. As stated before, the syllabus may identify not only what order the sub-concepts should be learned in, but also what source should be used to learn the sub-concept. Thus, the syllabus may include a combination of sources for the identified alternative sequence.

Figure 3:
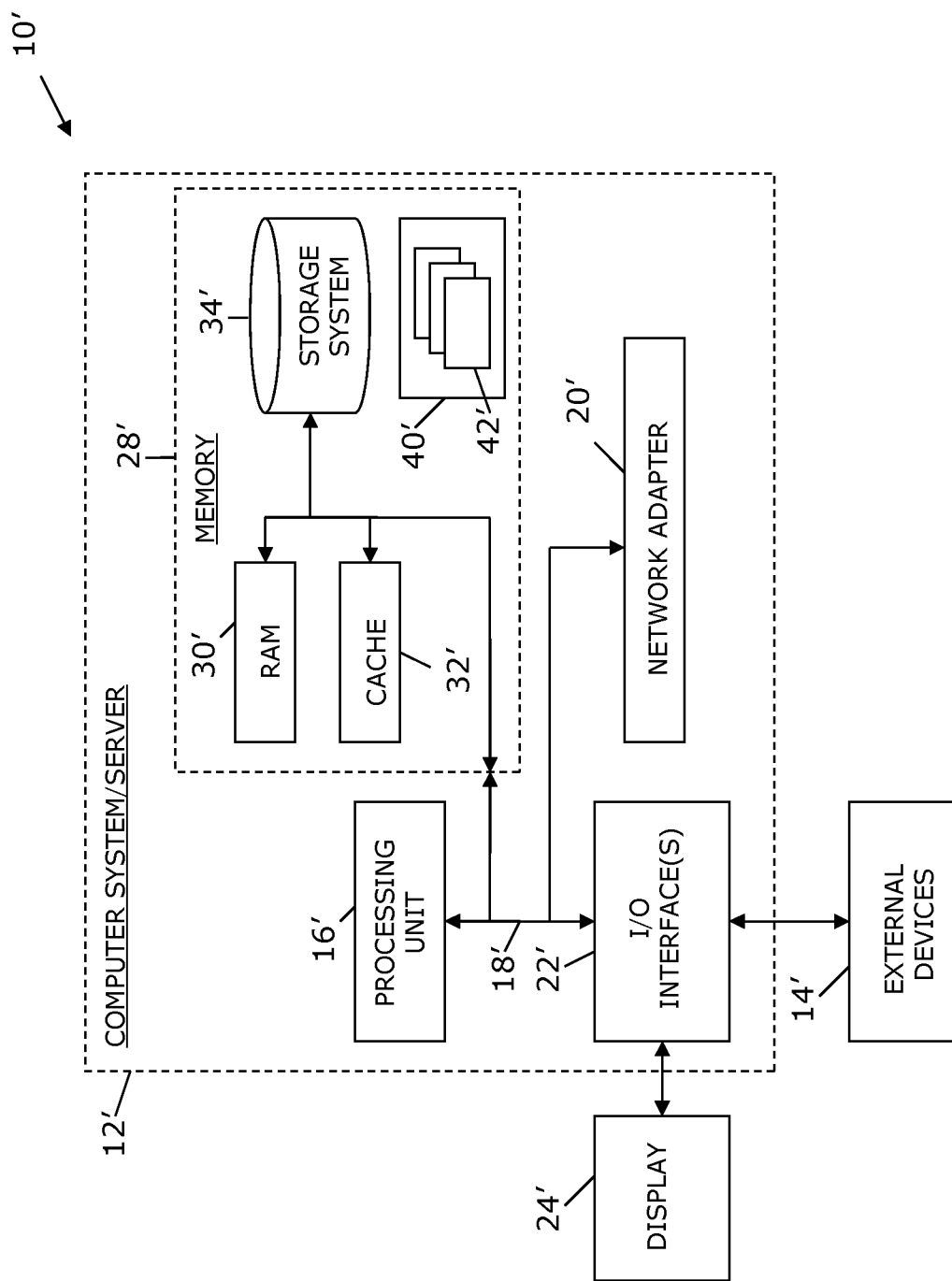
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
receiving input identifying a goal of a student, wherein the goal indicates (i) a target concept to be learned by the student and (ii) a desired expertise corresponding to the target concept;
receiving input indicating constraints of the student for reaching the identified goal, wherein the constraints comprise (i) a time budget corresponding to a length of time the student is willing to expend to learn the target concept and (ii) an effort budget corresponding to a level of effort the student is willing to expend to learn the target concept over the length of time;
identifying a base knowledge of the student with respect to the target concept, wherein the base knowledge comprises base knowledge categories each having a base knowledge value; and
generating a syllabus unique to and for the student to reach the identified goal within the indicated constraints in view of the base knowledge of the student with respect to the target concept, wherein the syllabus comprises a sequence of sub-concepts to be learned for reaching the identified goal and a lecture module recommended for learning each of the sub-concepts in the sequence, wherein each lecture module comprises a source for learning a corresponding sub-concept and a degree of hardness for the corresponding sub-concept, wherein the syllabus is generated by:
producing a plurality of alternative sequences of sub-concepts for reaching the identified goal, each sequence of sub-concepts having both a determined, corresponding (i) effort cost and (ii) time cost, wherein determining the corresponding effort cost and time cost comprises identifying relationships between sub-concepts of one alternative sequence and sub-concepts of another alternative sequence, wherein the identifying the relationships comprises utilizing a machine learning system that is trained using a training set of information comprising historical information from previous students who learned at least sub-concepts of the target concept and makes predictions about new relationships once trained, wherein the producing the plurality of alternative sequences comprises determining concept units included in learning the target concept, determining a relationship between the concept units included in learning the target concept, and generating a knowledge graph comprising a plurality of nodes, each corresponding to one of the concept units and edges, each connecting two of the plurality of nodes and representing a relationship between the connected two of the plurality of nodes; and determining, from the plurality of alternative sequences of sub-concepts, a particular one of the sequences of sub-concepts that both reaches the target concept at the desired expertise and fulfills the indicated constraints.

2. The method of claim 1, wherein the generating a syllabus comprises identifying at least one source for learning each sub-concept.

3. The method of claim 1, wherein the identifying relationships between sub-concepts is based upon historical information collected from previous students of the sub-concept.

4. The method of claim 3, wherein the historical information comprises queries submitted by the previous students.

5. The method of claim 3, wherein the historical information comprises a sequence of sub-concepts learned by one or more previous students to learn the target concept.

6. The method of claim 1, wherein the target concept and the sub-concepts of the target concept are aggregated into a directed acyclic graph based upon prerequisites between sub-concepts within a sequence of sub-concepts, wherein each node of the directed acyclic graph comprises one sub-concept and wherein each edge of the directed acyclic graph identifies a relationship between two nodes.

7. The method of claim 6, wherein the identifying relationships comprises conditionally grouping edges between sub-concepts of different sequences independently from other edge groupings.

8. The method of claim 7, wherein the identifying relationships comprises learning the joint distribution of the grouped edges within the directed acyclic graph.

9. The method of claim 8, wherein the identifying relationships comprises factorizing the joint distribution of the grouped edges.

10. The method of claim 9, wherein the identifying relationships comprises (i) using a classifier to optimize the probability of the direction of each edge within the group and (ii) choosing, for each edge, the direction having the highest probability.

11. An apparatus, comprising:

at least one processor; and a computer readable storage medium having computer readable program code embodied therewith and executable by the at least one processor, the computer readable program code comprising:

computer readable program code configured to receive input identifying a goal of a student, wherein the goal indicates (i) a target concept to be learned by the student and (ii) a desired expertise corresponding to the target concept;

computer readable program code configured to receive input indicating constraints of the student for reaching the identified goal, wherein the constraints comprise (i) a time budget corresponding to a length of time the student is willing to expend to learn the target concept and (ii) an effort budget corresponding to a level of effort the student is willing to expend to learn the target concept over the length of time;

computer readable program code configured to identify a base knowledge of the student with respect to the target concept, wherein the base knowledge comprises base knowledge categories each having a base knowledge value; and computer readable program code configured to generate a syllabus unique to and for the student to reach the identified goal within the indicated constraints in view of the base knowledge of the student with respect to the target concept, wherein the syllabus comprises a sequence of sub-concepts to be learned for reaching the identified goal and a lecture module recommended for learning each of the sub-concepts in the sequence, wherein each lecture module comprises a source for learning a corresponding sub-concept and a degree of hardness for the corresponding sub-concept, wherein the syllabus is generated by:

producing a plurality of alternative sequences of sub-concepts for reaching the identified goal, each sequence of sub-concepts having both a determined, corresponding (i) effort cost and (ii) time cost, wherein determining the corresponding effort cost and time cost comprises identifying relationships between sub-concepts of one alternative sequence and sub-concepts of another alternative sequence, wherein the identifying the relationships comprises utilizing a machine learning system that is trained using a training set of information comprising historical information from previous students who learned at least sub-concepts of the target concept and makes predictions about new relationships once trained, wherein the producing the plurality of alternative sequences comprises determining concept units included in learning the target concept, determining a relationship between the concept units included in learning the target concept, and generating a knowledge graph comprising a plurality of nodes, each corresponding to one of the concept units and edges, each connecting two of the plurality of nodes and representing a relationship between the connected two of the plurality of nodes; and determining, from the plurality of alternative sequences of sub-concepts, a particular one of the sequences of sub-concepts that both reaches the target concept at the desired expertise and fulfills the indicated constraints.

12. A computer program product, comprising:

a computer readable storage medium having computer readable program code embodied therewith, the computer readable program code executable by a processor and comprising:

computer readable program code configured to receive input indicating constraints of the student for reaching the identified goal, wherein the constraints comprise (i) a time budget corresponding to a length of time the student is willing to expend to learn the target concept and (ii) an effort budget corresponding to a level of effort the student is willing to expend to learn the target concept over the length of time;

computer readable program code configured to identify a base knowledge of the student with respect to the target concept, wherein the base knowledge comprises base knowledge categories each having a base knowledge value; and computer readable program code configured to generate a syllabus unique to and for the student to reach the identified goal within the indicated constraints in view of the base knowledge of the student with respect to the target concept, wherein the syllabus comprises a sequence of sub-concepts to be learned for reaching the identified goal and a lecture module recommended for learning each of the sub-concepts in the sequence, wherein each lecture module comprises a source for learning a corresponding sub-concept and a degree of hardness for the corresponding sub-concept, wherein the syllabus is generated by:
producing a plurality of alternative sequences of sub-concepts for reaching the identified goal, each sequence of sub-concepts having both a determined, corresponding (i) effort cost and (ii) time cost, wherein determining the corresponding effort cost and time cost comprises identifying relationships between sub-concepts of one alternative sequence and sub-concepts of another alternative sequence, wherein the identifying the relationships comprises utilizing a machine learning system that is trained using a training set of information comprising historical information from previous students who learned at least sub-concepts of the target concept and makes predictions about new relationships once trained, wherein the producing the plurality of alternative sequences comprises determining concept units included in learning the target concept, determining a relationship between the concept units included in learning the target concept, and generating a knowledge graph comprising a plurality of nodes, each corresponding to one of the concept units and edges, each connecting two of the plurality of nodes and representing a relationship between the connected two of the plurality of nodes; and
determining, from the plurality of alternative sequences of sub-concepts, a particular one of the sequences of sub-concepts that both reaches the target concept at the desired expertise and fulfills the indicated constraints.

13. The computer program product of claim 12, wherein the generating a syllabus comprises identifying at least one source for learning each sub-concept.

14. The computer program product of claim 12, wherein the identifying relationships between sub-concepts is based upon historical information collected from previous students of the sub-concept.

15. The computer program product of claim 12, wherein the target concept and the sub-concepts of the target concept are aggregated into a directed acyclic graph based upon prerequisites between sub-concepts within a sequence of sub-concepts, wherein each node of the directed acyclic graph comprises one sub-concept and wherein each edge of the directed acyclic graph identifies a relationship between two nodes.

16. The computer program product of claim 15, wherein the identifying relationships comprises conditionally grouping edges between sub-concepts of different sequences independently from other edge groupings.

17. The computer program product of claim 16, wherein the identifying relationships comprises learning the joint distribution of the grouped edges within the directed acyclic graph.

18. The computer program product of claim 17, wherein the identifying relationships comprises factorizing the joint distribution of the grouped edges.

19. The computer program product of claim 18, wherein the identifying relationships comprises (i) using a classifier to optimize the probability of the direction of each edge within the group and (ii) choosing, for each edge, the direction having the highest probability.

20. A method, comprising:
identifying a target topic to be learned;
identifying alternative sequences of sub-topics within the target topic, wherein each alternative sequence comprises a plurality of sub-topics that can be learned to learn the target topic and wherein each alternative sequence comprises at least one sub-topic different from at least one another alternative sequence, wherein the identifying the alternative sequences comprises determining concept units included in learning the target topic, determining a relationship between the concept units included in learning the target topic, and generating a knowledge graph comprising a plurality of nodes, each corresponding to one of the concept units and edges, each connecting two of the plurality of nodes and representing a relationship between the connected two of the plurality of nodes;
learning relationships between sub-topics of one alternative sequence and sub-topics of another alternative sequence, wherein the learned relationships indicate an effort difference between one sub-topic of one alternative sequence and a sub-topic of another alternative sequence, wherein the learning the relationships comprises utilizing a machine learning system that is trained using a training set of information comprising historical information from previous students who learned at least sub-topics of the target topic and makes predictions about new relationships once trained; and
generating, based upon the learned relationships, a recommended course sequence that is within a predetermined effort level, wherein the recommended course sequence comprises (i) one of the alternative sequences of sub-topics (ii) a learning source for learning each of the sub-topics, and (iii) a degree of hardness for learning each of the sub-topics.

* * * * *